United States Patent [19]
Lehe et al.

[11] 3,742,911
[45] July 3, 1973

[54] SLATTED FLOORING CONNECTOR SYSTEM

[75] Inventors: Russell B. Lehe, Park Ridge, Ill.; Richard L. Torbett, Akron, Ohio

[73] Assignee: Norandex, Inc., Cleveland, Ohio

[22] Filed: Sept. 13, 1972

[21] Appl. No.: 288,513

Related U.S. Application Data

[63] Continuation-in-part of Ser. No. 219,312, Jan. 20, 1972.

[52] U.S. Cl. .................. 119/28, 52/586, 52/588
[51] Int. Cl. ............................................. A01k 1/00
[58] Field of Search .................. 119/20, 28; 52/586, 52/588; 46/26, 16, 17

[56] References Cited
UNITED STATES PATENTS 3,680,530 8/1972 Drawsky .................. 119/28
3,348,459 10/1967 Harvey .................. 52/586 X Primary Examiner—Louis G. Mancene
Assistant Examiner—J. N. Eskovitz
Attorney—James H. Tilberry et al.

[57] ABSTRACT

A lightweight, easily-assembled slatted flooring system for an animal enclosure comprising a plurality of channels interconnected in spaced-parallel relationship by X-shaped connectors, each connector having arcuately-shaped ends extending from two of its legs which engage similarly shaped grooves in the upper, outer corners of each channel.

5 Claims, 7 Drawing Figures

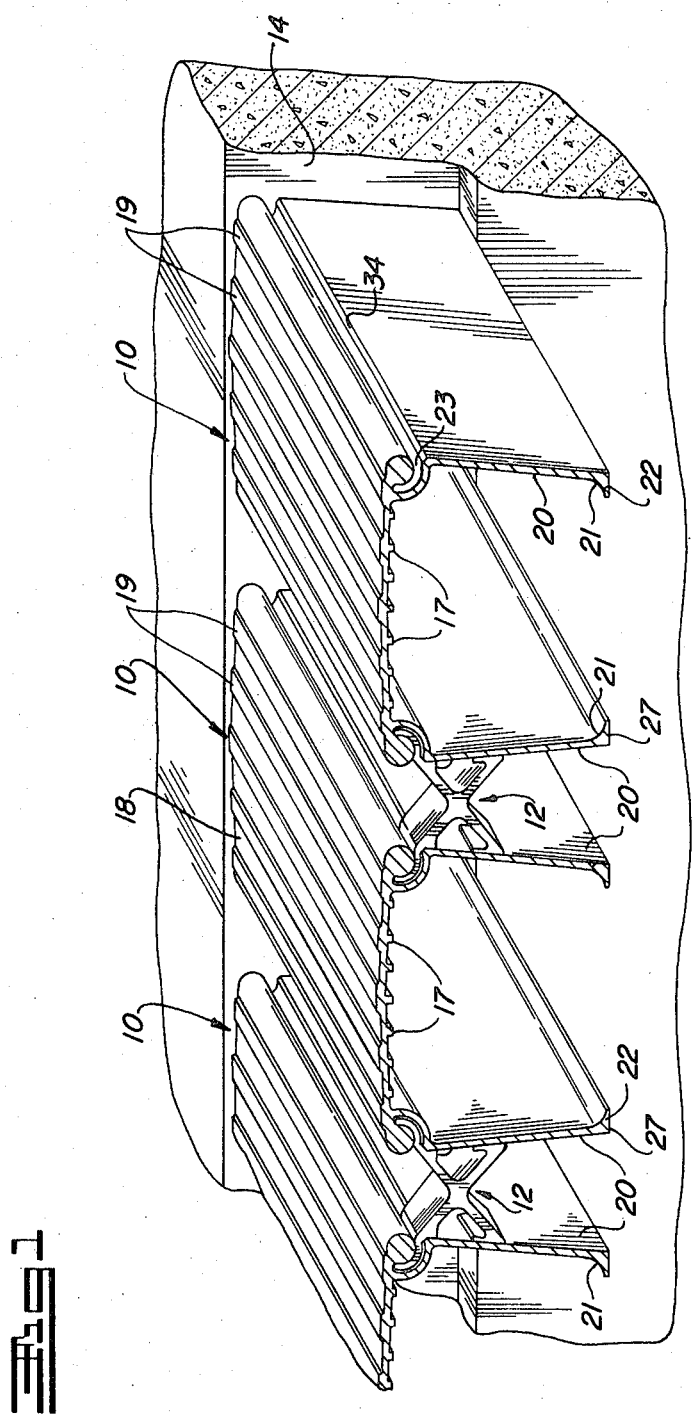

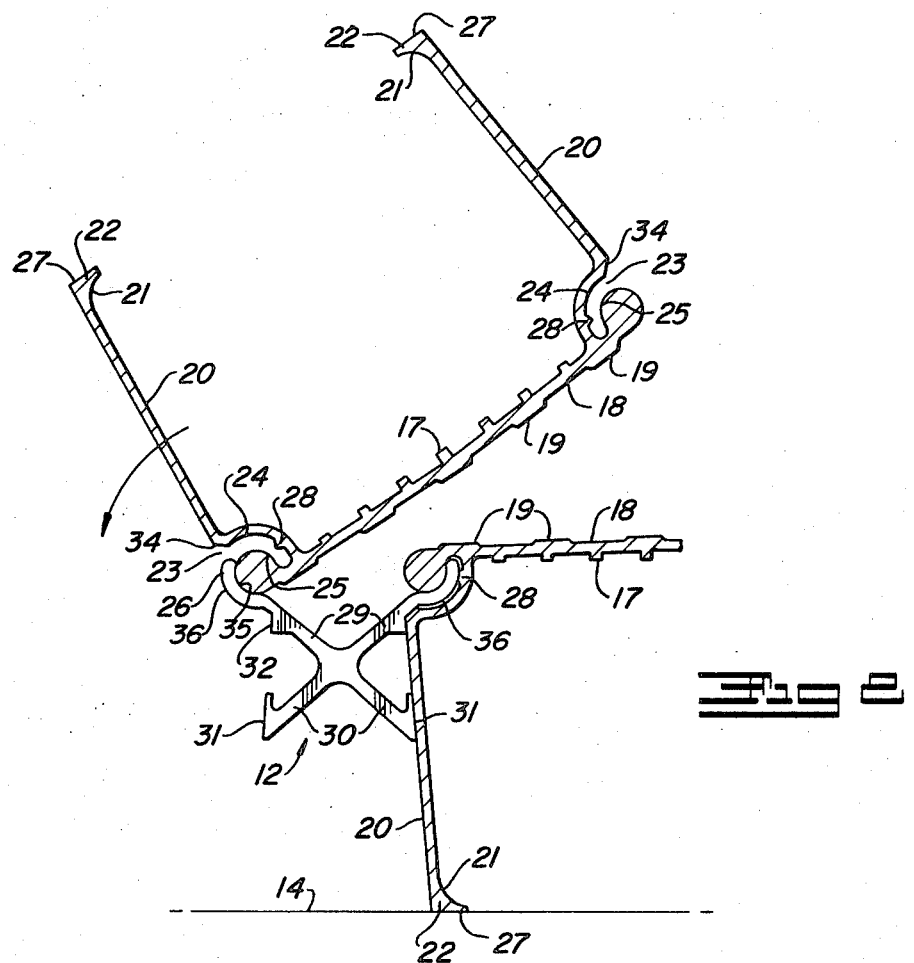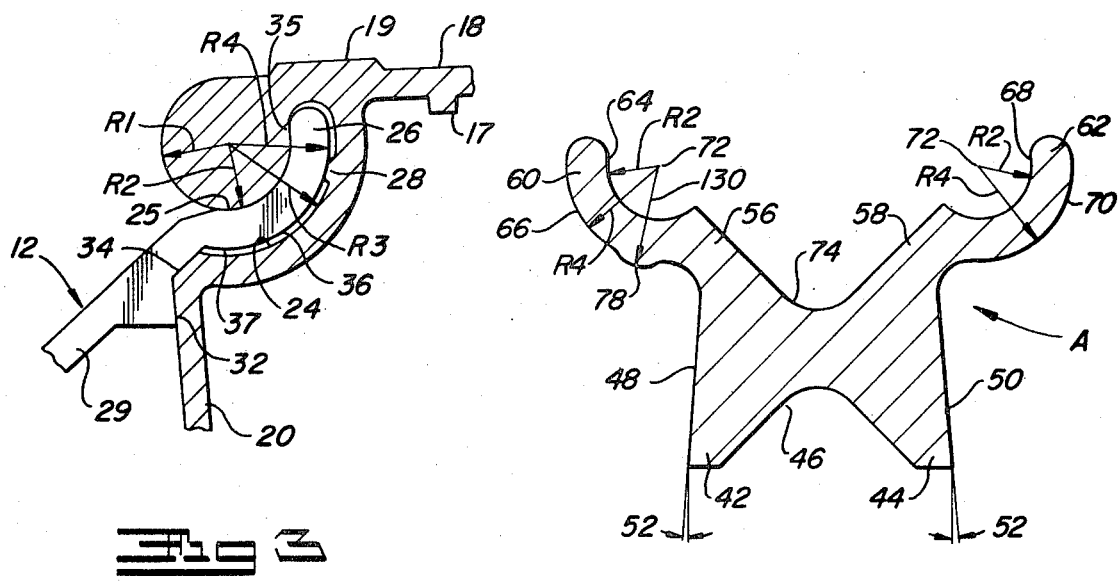

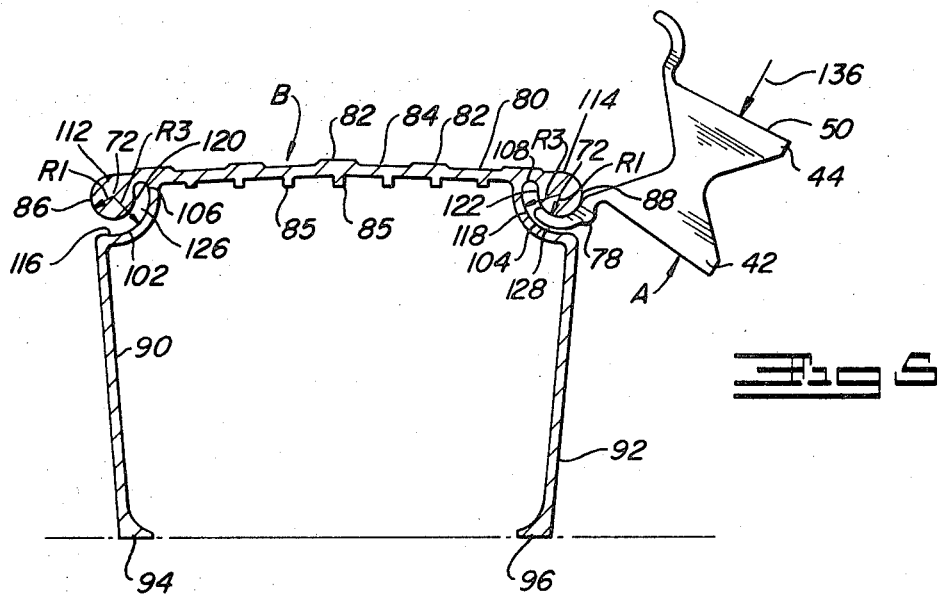
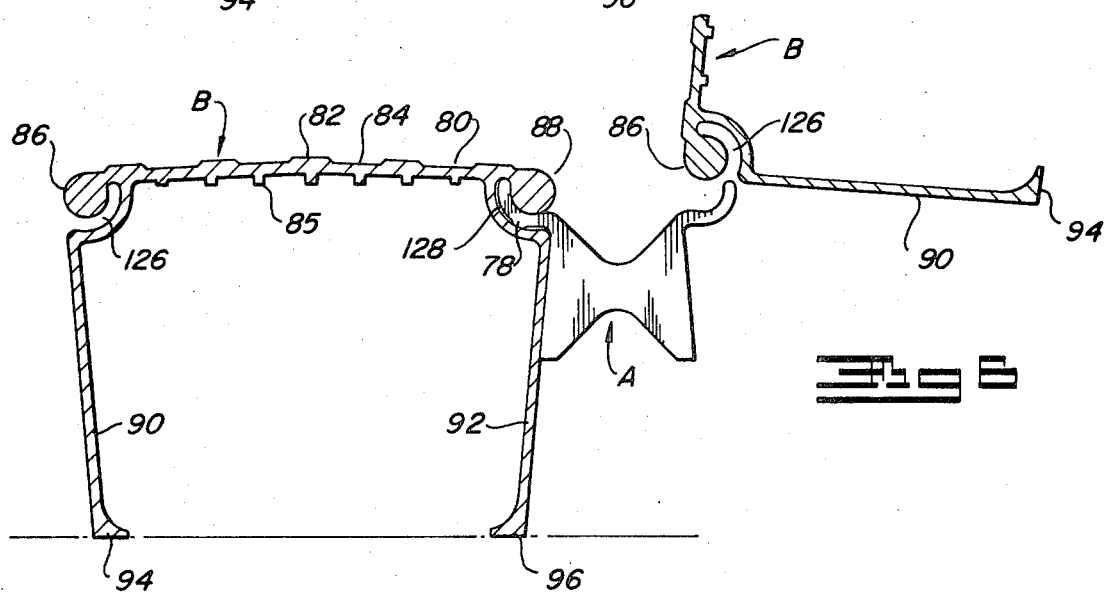
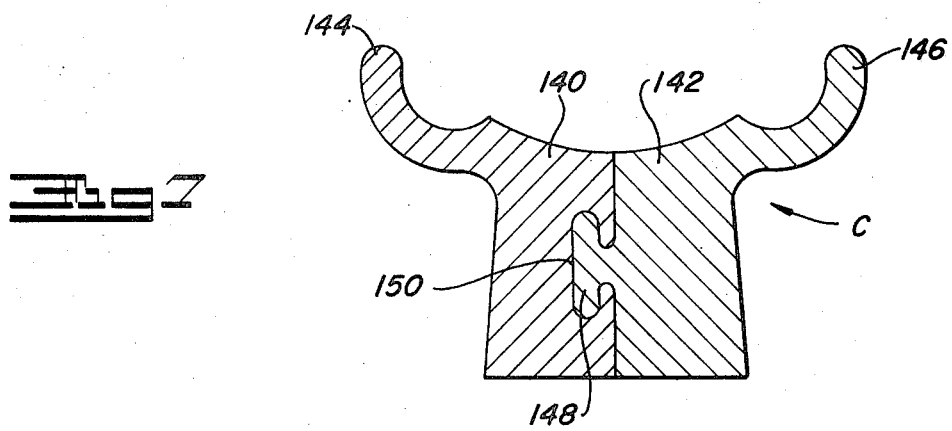

SLATTED FLOORING CONNECTOR SYSTEM

This application is a continuation-in-part of application Ser. No. 219,312 filed Jan. 20, 1972.

This invention pertains to a slatted flooring system and more particularly to the devices connecting the slats together.

The invention is particularly applicable to slatted flooring used in raising farm animals in a confined area and will be described with particular reference thereto, although it will be appreciated that the invention can be used for any slatted floor arrangement wherein a permanent, easily assembled, smooth, slatted flooring is desired.

It has long been recognized that the key to profitable production of farm animals raised in confinement is sanitation. Clean environments have heretofore been provided by erecting an enclosure having slatted flooring over a central portion thereof and a pit usually filled with water underneath the flooring through which waste matter can be washed away.

Such flooring has typically been constructed of wood which has proven undersirable for a number of reasons. Wood becomes slippery when wet or when impregnated with waste. It is expensive to construct, difficult to maintain and lasts a relatively short time. Some animals, particularly swine, have been known to chew through wooden slats. Other types of flooring have been similarly afflicted with inherent disadvantages. Steel floors encounter severe corrosion problems. Concrete slats are expensive to manufacture, costly to transport and often chip, sometimes cracking, thereby resulting in slat failure.

These problems have been recognized and at least partially overcome by some installations which provided a flooring comprising extruded aluminum channels arranged in spaced-parallel relationship. However, the channels have heretofore been interconnected and assembled by means which are either time consuming and/or lack sufficient rigidity to support or brace the channels from sidewall deflection thereby requiring the use of a stronger channel section than that actually necessary.

One such arrangement used a U-shaped connector having V-shaped ends to interconnect the channels with the U-shaped portion of the connector fitting on top of a channel and the V-shaped ends interlocking the adjoining channels' sidewalls. In addition to these connectors, the arrangement also used spacer clips fastened by nail to supporting joists from the top of the channels. While such an arrangement rigidly secured the slats together, the connectors and spacer clips themselves being on top of the slats were obstructions to what was otherwise a smooth flooring surface. Also there was difficulty in assembling the flooring in that each channel while having loose connectors resting thereon had to be juggled into interlocking position and secured by nailing to joists. Another arrangement used a connecting bar extending the width of the flooring to connect and space the channels by attaching the same to the underside of the channels. However, the bar afforded no structural support for the channel, permitting the sidewalls to flex under load. In addition, a tool was needed to spread the channels' sidewalls to fit over the connector bar, which operation had to be done while working underneath the flooring system in the pit. Furthermore, difficulty was encountered in assembling a relatively large number of slats to a single connector bar in that the bar had to be held horizontally while the slats' sidewalls were spread to engage the channels's underside with the connector prongs. Because there was a limit to the resiliency of the channel's sidewalls, each successive channel to be assembled to the connector bar had to be jostled into position while holding the sidewalls spread out.

The present invention contemplates a connector which allows the flooring to be assembled faster and more efficiently than those systems previously described while also providing a load-carrying connection which rigidizes the assembled flooring.

In accordance with the present invention, there is provided a plurality of channels assembled and held in spaced-parallel relationship by connectors. Each channel has a shaped groove formed in each of its upper, outer corners. Each connector has similarly-shaped ends extending therefrom. These ends fit into and interlock with the channel grooves thereby joining together two adjacent channels.

The body of the connector extends outwardly and downwardly to contact the sidewalls when the flooring is assembled and brace the sidewall against deflection.

In the preferred embodiment, the connector is X-shaped and a rigid connection is assured by providing a deformable projection in the channel groove which is flattened by the tongue-shaped ends of the connector when the flooring is assembled.

To assemble, the connectors are hand inserted in one groove of a channel until contacting the deformable projection therein. The adjacent channel is then held in an inverted position and moved until its channel groove fits over the free connector tongue end. The adjacent channel is then rotated downwardly into its assembled position and in so doing the deformable projections in both grooves are crushed by the connector tongues thereby providing a rigid, interlocking connection.

The principal object of the invention is to provide a lightweight slatted flooring system which is easily assembled.

Another object of the invention is to provide a connection for slatted flooring system which braces the slats against deflection.

A further object of the invention is to provide a slatted flooring system with slats rigidly interconnected.

A further object of the invention is to provide an improved slatted flooring system and method of constructing the same which is both simple and economical.

The invention may take physical form in certain parts and arrangements of parts a preferred embodiment of which will be described in detail herein and illustrated in the accompanying drawings which form a part hereof and wherein:

FIG. 1 is a perspective view of the assembled flooring;

FIG. 2 is a cross-sectional elevational view of the channel and connector in accordance with the invention;

FIG. 3 is an enlarged fragmentary view of FIG. 2, showing the joint between the connector and channel;

FIG. 4 is a cross-sectional elevational view of another form of connector member constructed in accordance with the present invention;

FIG. 5 is a cross-sectional elevational view showing the connector of FIG. 4 being installed in a channel member;

FIG. 6 is a cross-sectional elevational view showing the connector of FIG. 4 completely installed in a channel member and another channel member in position for attachment to the connector member; and FIG. 7 is a cross-sectional elevational view of another form of connector member constructed in accordance with the present invention.

Referring now to the drawings wherein the showings are for the purpose of illustrating a preferred embodiment of the invention only and not for the purpose of limiting same, FIG. 1 illustrates the general arrangement of the slatted flooring construction. The flooring comprises a plurality of longitudinally extending, inverted U-shaped channels 10. Connectors 12 interlock the channels 10 in spaced-parallel relationship. The flooring is supported by the end walls 14 of a pit which the flooring covers.

Not shown because unnecessary to the description of the invention is the farm animal enclosure. Such enclosure generally comprises a frame structure having a concrete floor adjacent the slatted flooring. Usually the slatted flooring is in the center of the enclosure with the concrete floor or slabs on both sides of the slatted flooring enclined vertically-upwardly therefrom. Another typical enclosure utilizes a concrete center section, generally V-shaped, with two slatted floors extending vertically-downwardly from both ends of the center section. Either arrangement permits easy maintenance because the refuse can be washed from the concrete pad or pads through the slatted flooring to the pit below.

Of course, the slatted flooring can comprise the complete floor of the enclosure. Such construction requires relatively long channel members and channel supports in the form of joists or a center wall to prevent the channel member from deflecting vertically downward under the weight of the animals.

As is thus shown in the cross-sectional view of the channel in FIG. 2, each channel 10 is in the shape of an inverted U having a base 18, defining a load carrying surface and a pair of sidewalls 20. The base can be flat although in the preferred embodiment it is slightly crowned with a plurality of longitudinally-extending ribs 17, 19 on the lower and upper surfaces respectively. Ribbing and crowning the base 18 increases its rigidity thereby allowing the channel to be constructed of a thinner cross-sectional area than would otherwise be required.

The channel sidewalls 20 taper inwardly at an angle of about 5° to facilitate the flowing of waste matter between the channels to the pit below. Other angles may be employed. Extending inwardly from the bottom of each sidewall 20 is a support flange 22 having a flat bottom surface 27. The flanges should be long enough and the surfaces 27 are in a common plane such as to provide a stable support for each channel thereby preventing any tendency of the channel to rock or roll under load. The flanges are shown as filleted 21 to the sidewall thereby strengthening the sidewall and flange joint.

Formed at the outer juncture of each sidewall 20 with the base 18 is a groove 23 extending the entire length of the channel 18 although it is not necessary in accordance with the teachings of the invention to so extend the groove. The groove 23 is formed by a lower wall surface 24 and an upper wall surface 25 and curves upwardly toward the center plane of the channel.

Extending from at least one of the walls 24, 25 in the groove 23 is a deformable projection or interference-lock rib 28.

A chamfer 34 is formed at the outer juncture of the lower wall surface 24 and the sidewall 20.

In the preferred embodiment the upper 25 and the lower 24 wall surfaces are arcuate being defined respectively by radii, R-1 and R-3 which are struck from the same center. It should be appreciated that the invention as disclosed herein is not limited to the shape of the groove as so described, but such groove can assume a wide variety of configurations for reasons which will hereafter be apparent.

The connector 12, can assume a wide variety of cross-sectional configurations such as trapezoidal, rectangular, I-beam, etc. However, in the preferred embodiment the connector 12 is X-shaped in cross section and comprises a pair of oppositely flaring upper legs 29 and a pair of oppositely flaring lower legs 30. Extending from each upper leg is an arcuate end 26 which fits into the groove 23, when the slatted flooring is assembled. The upper ends 26 have arcuate upper 35 and lower surfaces 36 defined by radii R-2 and R-4, respectively, which have the same common center as groove radii R-1 and R-3.

A relief, 32, is provided on the lower side of each upper leg 29 of the connector 12. This relief 32 corresponds in shape to the chamfer 34 on sidewall surface 24 of the channel member and abuts thereagainst when the flooring is assembled. The relief 32 provides both a positive stop for travel of the upper end 26 into the groove and a bracing support for sidewall deflection.

The bottom legs 30 of the connector have generally flat ends 31 which engage the sidewalls 20 generally midway of their width when the flooring is assembled. The spacing between channels is therefore a direct function of the distance between the flat ends 31 being increased or decreased as the distance between ends 31 increases or decreases respectively. Furthermore, a line drawn through the relief 32 and the end 31 of the connector 12 has a slope identical to the slope of the channel sidewalls 20, i.e., 5°.

Ends 31 are shown as flared and contact the channel sidewalls 20 approximately midway their width because it is at this point where sidewall deflection will be the greatest.

When the flooring is assembled a clearance 37 exists between the groove's lower wall surface 25 and the lower connector surface 36. In the preferred embodiment this clearance is taken up by projection 28 in the groove which initially was triangular in shape, having a height at least equal to and preferably greater than the clearance 37. Projection 28 is deformed by the upper connector end 26 when assembly takes place and a rigid joint connection interlocking adjacent channel members 10 is assured. The projection 28 is shown or located beyond the midway point of the groove to insure that the connector end is firmly in the groove 23 before meeting resistance of the projection 28.

It should also be appreciated that the projection 28 could be designed to break away from the wall when contacted by the connector end. The projection would then wedge itself between connector surface 36 and groove wall 28, taking up the clearance therebetween 37 and assuring a rigid joint.

Structurally, once the flooring is assembled, a rigid X brace defined by the connector relief 32 and connector end wall 31 prevents movement between adjacent channels. The connector upper ends 26 in conjunction with grooves 23 provide means for assembling the flooring system and once assembled serve further to stabilize the channels against any rock or rolling motion imparted thereto. The projection 28 extending into the groove further rigidizes the entire connection between adjoining channels effectively stopping any movement of the channels resulting from small or slight deflections thereof and also preventing the connector from walking or sliding down the length of the channel. Hence, adjacent channels 10 are securely interlocked together.

The flooring system is assembled by placing one of the channels 10 over the pit supports 14 in an upright position; inserting the arcuate ends 26 of several connectors 12 into spaced points on the grooves 23 of the channel; positioning another channel 10 in an inverted relationship on top of the first channel; moving the inverted channel 10 laterally until its groove 23 contacts the arcuate free ends 26 of the connectors and then rotating the inverted channel 10 into an upright position thereby seating the arcuate ends 26 into grooves 23 and crushing the projections 28.

The rotation of the channel groove 23 into the arcuate connector end 26 is assured because the radius R-1 of the upper wall 25, is the same as the radius R-2 of the upper surface 35 of the connector 12. Therefore, a good ball and socket joint is assured by the rotation of wall surface 25 on the surface 35.

It is therefore apparent that a wide variety of modifications may be made to the lower wall 24 of the groove and/or the lower surface of the connector, 36. These modifications may be made, for example, if it is desired to more readily insure the starting of the connector end 26 into the channel groove 23 for applications requiring relatively long channel lengths which might prove difficult to rotate. For example, the wall surface 25 could be moved inwardly by merely shifting the center of radius R-1 inward thereby leaving the sidewall chamfer 34 jutting out further to engage the tip of the connector end 26. Conversely, the sidewall 20 could be also modified to have its chamfer 34 extend further laterally. Also, the radius R-4 defining the bottom channel groove wall 24 could be eliminated and replaced by a series of somewhat larger radii blending into a radius of R-2 length at the inner extremity of the groove. The opening of the groove could also be flared with a straight surface blending into a curved surface. Some of these modifications may also be incorporated on the lower wall surface 36 of the connector 12. These modifications could be incorporated into the connector 12 either in conjunction with the modifications to the channel groove 23 or independently of the modifications of the channel groove.

Further modifications to the groove and connector end will become apparent to those skilled in the art. For example, the arcuate grooves 23 and connector ends 26 illustrated could be replaced by grooves and connector ends having straight parallel wall surfaces which could either be inclined vertically-upwardly or the walls could be straight and come to a point so as to be V-shaped. As so modified, the channels would not be rotated into position, but simply dropped vertically downward into or moved laterally inward to engage the free connectors' ends. In each instance, a crushable projection extending from a wall in the groove would insure a rigid connection interlocking the channels together.

In the arrangement of FIGS. 1-3, difficulty is sometimes experienced in deforming projection 28 with long spans. By way of example, the assembly procedure will be described. With one channel member 10 in position, a plurality of connector members 12 are individually assembled to the position shown in figure two. With each connector member 12 being assembled individually, there is no problem with deformation of deformable projection 28. However, assuming that 3 connector members 12 are positioned in spaced-apart relationship, assembly of the next channel member 10 in the manner shown in FIG. 2 requires simultaneous deformation of projection 28 at three locations by the three connector members 12. Simultaneous deformation of deformable projection 28 at three spaced-apart locations requires a considerable amount of force which sometimes cannot be exerted by a single person and makes assembly difficult. In order to eliminate this need for simultaneous deformation of a deformable projection at spaced-apart locations, another form of connector member is shown in FIG. 4.

Connector member A of FIG. 4 may be extruded from aluminum in the shape shown. The extrusion may then be cut into short lengths, such as around 2 inches long perpendicular to the plane of the paper in FIG. 4. It will be recognized that other lengths of connector may be used. However, the extremely short length of connector member A and connector members 12 makes it possible to rigidly connect adjacent channel members with connectors of very short length so that material is saved Connector member A has a peripheral shape similar to that of connector 12. Connector A has spaced-apart lower legs 42 and 44. An arcuate recess 46 between legs 42 and 44 cuts down on the weight of connector A and minimizes the amount of metal used for the connector. Legs 42 and 44 have outer surfaces 48 and 50 which diverge outwardly from the vertical by an angle 52 of around 5°. The lower end portions of outer surfaces 48 and 50 are adapted to bear against the outer surfaces of the downwardly extending sidewalls on a channel member. Connector member A has outwardly and upwardly extending spaced-apart legs 56 and 58 which include curved portions 60 and 62. Each curved portion 60 and 62 includes upper and lower arcuate surfaces 64 and 66, and 68 and 70. Surfaces 64 and 68 each lie on the periphery of a circle having a radius R-2 with centers 72. Lower surfaces 66 and 70 lie on the periphery of circles having a common radius R-4 with centers also at 72. Upper surface 74 of connector A is downwardly curved as at 74 between legs 56 and 58. This minimizes the material used for connectors A, and also provides a downwardly sloping surface in which waste material will not be so likely to collect as it fall in the space between adjacent channel members. In the areas where outer surfaces 48 and 50 begin to merge with curved surfaces 66 and 70, surfaces 48 and 50 are adapted to bear against the outer surfaces of the downwardly projecting sidewalls on adjacent channel members.

In the arrangement shown, curved portion 60 has a deformable projection 78 on lower surface 66 thereof. Deformable projection 78 may extend outwardly beyond surface 66 around 0.02 inch. It will be recognized that this projection may extend various distances and may have a variable width depending upon how much wedging action is desired. In the arrangement shown, arcuate deformable projection 78 has a width of around one-eighth inch. Opposite curved portion 62 does not have a deformable projection thereon.

Connector A is usable with channel members B as shown in FIGS. 5 and 6. Channel members B have a shape substantially the same as channel members 10 of FIGS. 1–3 except for the omission of deformable projections 28. Channel members B have a generally inverted U-shaped cross-sectional configuration. This shape includes an upper base portion 80 which is crowned slightly upward. Alternate ribs 82 and grooves 84 are formed on the outer upper surface of base portion 80 to provide skid resistance. Spaced-apart projections 85 on the lower surface of base portion 80 reinforce upper base portion 80 against bending when a load is applied to base portion 80. Upper base portion 80 has spaced-apart opposite edges 86 and 88. Each channel member B includes spaced-apart downwardly extending sidewalls 90 and 92. Each sidewall 90 and 92 has an enlarged bottom portion 94 and 96 which normally rests on a permanent footing, such as a concrete wall or the like. Sidewalls 90 and 92 slope inwardly toward one another from the vertical at an angle of around 5°. This makes it less likely that the outer surfaces of sidewalls 90 and 92 will collect waste material as it falls downwardly in the space between adjacent channel members when the floor is assembled.

Each sidewall 90 and 92 curves inwardly as at 102 and 104 to intersect upper base portion 80 as at 106 and 108 at locations spaced inwardly from opposite outer edges 86 and 88. Upper base portion 80 has enlarged rounded opposite edge portions 112 and 114. Upper surfaces 116 and 118 on curved portions 102 and 104 of sidewalls 90 and 92 lie on the periphery of circles having radii R-3, which is slightly greater than radii R-4, and have a common center 72. Downwardly facing arcuate surfaces 120 and 122 on opposite edge portions 112 and 114 lie on the periphery of circles having radii R-1 which is substantially identical with radii R-2 and the circles have a common center 72. Arcuate surfaces 116 and 120, and 118 and 122, are in spaced-apart relationship to define arcuate elongated grooves 126 and 128 which extend the full length of channel members B. Channel members B may be of any desirable length, such as from two feet up. In the arrangement described, grooves 126 and 128 have a width slightly greater than the width of arcuate portion 60 and 62 on connector A. This is because radii R-1 are substantially the same as radii R-2, while radii R-3 are slightly greater than radii R-4. However, distance 130 from common center 72 to the outer surface of deformable projection 78 is slightly greater than radii R-3. This provides a wedging interference fit of that portion of arcuate portion 60 within a groove 128.

In order to assemble a floor of the type described, an elongated channel member B is first positioned on spaced-apart walls or other supports with end portions of enlargements 94 and 96 resting thereon. One or more connector members A are then manipulated to the position shown in FIG. 5 with arcuate portion 60 extending into a groove 128. One or more blows indicated by arrow 136 against outer surface 50 of leg 44 will then drive arcuate portion 60 completely into groove 128 and cause projection 78 to be deformed so that arcuate portion 60 is tightly wedged within groove 128. That portion of arcuate portion 60 between upper curved surface 64 and deformable projection 78 will be tightly gripped between arcuate surfaces 118 and 122 of groove 128. With arcuate portion 60 of connector A fully within groove 128, as shown in FIG. 6, it will be seen that the lower portion of outer surface 48 on leg 42 bears against the outer surface of sidewall 92 at a location spaced downwardly from groove 128, while the upper portion of outer surface 48 bears against the outer surface of sidewall 92 closely adjacent groove 128.

In order to assemble another channel member B onto connector A, another channel member B is positioned as shown in FIG. 6 with arcuate portion 62 on connector A aligned with groove 126. Adjacent channel member B is then arcuately swung into postion in the same manner as described with respect to FIGS. 1–3. With the arrangement shown and described, edges 86 and 88 of adjacent channel members B will be spaced-apart any desirable distance depending upon the width of connector A. For example, connectors A may be dimensioned to provide a space between adjacent edges 86 and 88 of three-eighths inch, three-fourths inch or 1 inch. Edges 86 and 88 provide a slot between adjacent channel members B which is completely open so that waste material may freely fall therethrough. The opening between adjacent edges 86 and 88 is blocked only at infrequent intervals such as around every three feet of length, by a relatively short connector member A.

In the preferred arrangement, deformable projection 78 is located more closely adjacent outer surface 48 of leg 42 than to the outer terminal end of arcuate portion 60. Therefore, a major portion of arcuate portion 60 may be inserted into a groove 128 to provide guidance when applying hammer blows as at 136 to deform projection 78. It will also be recognized that the channel members of FIGS. 1–3 have grooves which include closed ends and open entrance ends. Projections 28 are also preferably located more closely adjacent the closed ends of the grooves than the open entrance ends thereof for the same purpose. That is, the arcuate leg portions of connectors 12 in FIGS. 1–3 are substantially inserted into the grooves before the need for deforming projections 28 occurs. This provides ample guidance and insures a good fit of the arcuate projection portions within the grooves.

FIG. 7 shows another connector member C having a peripheral shape similar to connector A. Connector C is formed from two individual parts 140 and 142. Part 140 has an arcuate upper projection 144 shaped similar to arcuate portion 60 except for the absence of a deformable projection 78. Part 142 has an arcuate projection 146 shaped similar to arcuate portion 62 of connector A. Part 142 is formed with a longitudinally extending enlarged lug member 148 while part 140 is formed with a longitudinally extending groove 150 having a shape corresponding to lug 148. Applying forces in opposite directions to parts 140 and 142 will allow parts 140 and 142 to slide apart. With parts 140 and 142 separated from one another, enlarged lug 148 may be aligned with groove 150 and the parts moved toward one another so that lug 148 will be received in groove 150 to lock parts 140 and 142 together. Connector C is useful for intermediate sections of a floor having adjacent channel members B therein. For example, separable connector C may be used for a center channel member B at the middle of a floor. Such connector C would be used on both opposite sides of the center channel member B. Such center channel member B could then be moved longitudinally of its length so that parts 140 and 142 would separate from one another and that center channel member could be lifted out of the floor to provide access to the pit area. Reassembly of the center channel member would proceed in the reverse order.

It will be recognized that many different arrangements are possible for securely interlocking the channel members to the connectors. For example, the arcuate portions on the connectors may have a curvature slightly different than that of the grooves so that the arcuate projections would be deformed within the grooves. In other arrangements, it is possible to apply blows against edges 86 and 88 of a channel member for slightly deforming those edges into firm engagement with the arcuate portions of connectors which are already received in the grooves. It is also possible to assemble the floor described without using any deformable projections if so desired. It is also possible to apply deformable or squeezable elastomeric material or the like over the arcuate portions of the connectors so that the elastomeric material will be deformed and wedge the arcuate portions tightly within the grooves.

It will be recognized that connecting adjacent channel members adjacent their upper edges thereof provides an extremely strong construction. Lateral loads applied to the upper surface of the flooring system are less likely to cause deformation of the channel members.

Deformable projection 78 is somewhat of an undulation or bump extending the full length of outer surface 66 on arcuate portion 60. This makes it possible to extrude connector A in the shape shown and to then cut the extrusion into short lengths. Furthermore, deformable projection 78 extends the full length of arcuate portion 60 so that no wobbling of connector A will occur.

Although the invention has been shown and described with reference to certain preferred embodiments, it is obvious that equivalent alterations and modifications will occur to others skilled in the art upon the reading and understanding of this specification. The present invention includes all such equivalent alterations and modifications and is limited only by the scope of the claims.

Having thus described our invention, we claim:

1. A flooring construction comprising; a plurality of elongated channel members each having a generally inverted U-shaped cross-sectional configuration and including an upper base portion having spaced-apart opposite edges and a pair of spaced-apart sidewalls extending downwardly from said base portion, said sidewalls being integral with said base portions and being inwardly curved adjacent said base portion to intersect said base portion at locations spaced inwardly from said opposite edges of said base portion and define curved sidewall portions having outer surfaces defining first groove forming surfaces, said base portion having opposite edge portions including downwardly and outwardly curved lower surface portions defining second groove forming surfaces in spaced relationship to said first groove forming surfaces, said first and second groove forming surfaces defining elongated grooves in the upper outer edges of said channel members, a plurality of locking and spacing connector members for connecting adjacent ones of said channel members with adjacent edges of aid base portions on adjacent channel members in spaced-apart relationship, said connector members including spaced-apart lower wall portions for engaging said sidewalls on adjacent ones of said channel members at locations spaced below said grooves, said connector members having spaced-apart upper outwardly extending leg portions receivable in said grooves on adjacent ones of said channel members, said leg portions having upper and lower surfaces, said grooves having a predetermined width greater than the thickness of said leg portions, a deformable projection on at least one of said surfaces on one of said leg portions providing said one leg portion with a thickness greater than the width of said grooves for wedging and locking said one leg portion in one of said grooves by deformation of said deformable projection.

2. The construction of claim 1 hwerein said deformable projection is on said lower surface of said one leg portion, said one leg portion having an outer terminal end and an inner end portion, said deformable projection being located closer to said inner end portion than to said terminal end.

3. A locking and spacing connector for connecting adjacent structural members in spaced-apart relationship, said connector inclduing spaced-apart lower end portions having outer surfaces and spaced-apart upper leg portions curved outwardly and upwardly beyond said outer surfaces of said lower end portions, said leg portions having arcuate upper and lower leg surfaces, and a deformable projection extending outwardly from one of said leg surfaces on at least one of said leg portions.

4. The connector of claim 3 wherein said deformable projection is on said lower leg surface.

5. The connector of claim 4 wherein said one leg portion has a terminal end and an inner end, said projection being located closer to said inner end than to said terminal end.

* * * * *